(12) United States Patent
Friemel

(10) Patent No.: US 8,045,180 B2
(45) Date of Patent: Oct. 25, 2011

(54) DEVICE FOR FLEXIBLE DETECTION OF THE GEOMETRIC SHAPE OF OBJECTS BY MEANS OF OPTICAL 3D MEASURING TECHNOLOGY

(75) Inventor: Jörg Friemel, Bochum (DE)

(73) Assignee: Smart Optics GmbH, Bochum (DE)

( * ) Notice: Subject to any disclaimer, the term of this patent is extended or adjusted under 35 U.S.C. 154(b) by 247 days.

(21) Appl. No.: 12/465,096

(22) Filed: May 13, 2009

(65) Prior Publication Data

US 2009/0284755 A1 Nov. 19, 2009

(30) Foreign Application Priority Data

May 13, 2008 (DE) .................. 10 2008 023 264

(51) Int. Cl.
*G01B 11/24* (2006.01)
(52) U.S. Cl. ........................................ 356/601
(58) Field of Classification Search .............. None
See application file for complete search history.

(56) References Cited

U.S. PATENT DOCUMENTS

2004/0015075 A1* 1/2004 Kimchy et al. ............ 600/424

* cited by examiner

*Primary Examiner* — Tu Nguyen
(74) *Attorney, Agent, or Firm* — Laurence A. Greenberg; Werner H. Stemer; Ralph E. Locher

(57) ABSTRACT

A device for detecting the geometrical shape of measurement objects with a computer, a 3D sensor and an object carrier for fixing the measurement object. The computer combines the measurements recorded by a 3D sensor. The image registration is improved by using an areally operating 3D sensor. An adjusting device is used to move the measurement object rather than the 3D sensor. The object carrier is adjustable in a manually guided manner about a plurality of linear axes and/or rotation axes by the adjusting device with position transmitters that forward their positions to the computer in the event of a measurement. The computer is set up for calculating, with the aid of suitable software, the position of the measurement object from the positions of the position transmitters and the positions of the axes relative to the 3D sensor.

19 Claims, 4 Drawing Sheets

DEVICE FOR FLEXIBLE DETECTION OF THE GEOMETRIC SHAPE OF OBJECTS BY MEANS OF OPTICAL 3D MEASURING TECHNOLOGY

BACKGROUND OF THE INVENTION

Field of the Invention

The invention relates to a device for detecting the geometrical shape of measurement objects with a computer, a 3D sensor and an object carrier for fixing the measurement object, wherein the computer is set up for combining, with the aid of suitable software, the measurements recorded by the 3D sensor.

Optical 3D measurement technology is used e.g. in mold making for the detection of handmade mold prototypes made of clay, in order to detect them 3-dimensionally and to subject the 3D data to further processing by means of computers. The use of 3-dimensional object measurement systems is also known in dental technology, where 3D scanners are used for measuring dental impressions. The computer-aided construction and manufacture of dentures is possible on the basis of the 3-dimensional data of the dental impressions obtained.

Various measurement principles exist for optical 3D measurement technology. Widespread principles include laser triangulation and stripe projection, where measurement accuracies in the range of 10 μm to 100 μm can be achieved.

During the measurements, so-called "depth images" arise which are detected from a specific viewing direction of the sensor toward the measurement object. In this case, it is customary to carry out the measurements from different viewing directions and to combine the depth images by means of suitable reverse engineering software. Knowledge of the spatial transformation from one viewing direction of the sensor to the other is required for this purpose. The different viewing directions are obtained by moving measurement object and sensor relative to one another. In this case, image registration methods are usually used, by means of which the individual images or measurements are brought into correspondence in the best possible way, wherein a distinction can be made between a so-called coarse registration and a fine registration effected by means of best-fit methods. Possibilities for image registration are known from the prior art and are described for example by Devrim Akca, "Full automatic registration of laser scanner point clouds", Optical 3D-Measurement Techniques VI, Zurich, Switzerland, 22-25 Sep. 2003, Vol. I, pp. 330-337".

Apparatuses with 3D sensors on a movement arm are known for carrying out the 3D measurements. The "sensor-based movement arm" typically has seven rotation axes that are moved manually and are equipped with position transmitters, from which the angle position can be read with the aid of computers. The 3D sensors used to detect the measurement object operate in punctiform or linear fashion. The expression "Faro arms" has also become established for such sensor-based movement arms since such movement arms are produced, inter alia, by the company Faro Technologies Inc., Lake Mary, Fla., USA. Such an arm can sweep over a specific space, which shall be referred to hereafter as "tracked volume". The 3D sensor is fixed to the movement arm. If the arm is located on a base surface, the tracked volume of the arm has an approximately hemispherical shape. Such systems are supplied for example by the company DESCAM 3D Technologies GmbH, Raiffeisenallee 6, D-82041 Oberhaching.

The system is guided manually over the measurement object. At each point in time, the position transmitters provide the computer with information about their angle positions, such that the computer can calculate the spatial position of the 3D sensor. The sensor has a small measurement volume in comparison with the tracked volume.

During measurement by means of the 3D sensor operating in punctiform or linear fashion, a "single shot" measurement principle is used, wherein recording takes place in only one camera cycle. This is necessary because the sensor is moved manually and is not stationary. Line-type laser triangulation is usually used as a measurement principle, wherein the line is usually situated transversely with respect to the direction of movement. The triangulation method is described in DE 43 42 830 C1, for example.

If the data obtained are displayed directly, the manually guided measurement of the object can be concomitantly followed on the screen. The characteristic designation "electronic painting" is also used for this entire sequence. What is advantageous about the method is that the spatial transformation is known at each point in time and time expended in the operation of reverse engineering software is thus obviated.

On the other hand, however, certain disadvantages also arise. A manually guided sensor-based movement arm having typically seven axes has mechanical inaccuracies and dynamic instability in connection with the movements and accelerations that occur. At the same time, the mass of the arm is limited owing to the manual guidance, with the result that the stiffness of the construction is also limited even when carbon fibers are used. Since the detection of large objects is also desirable on the part of customers, the arms are generally designed to be relatively long, for example for movement spaces of 100×100×100 mm to 2×2×2 m. The localization error propagates over the length of the arms.

Furthermore, the 3D sensor operates as a line sensor, for which reason fine registration of the contour maps of the depth images is not possible. Consequently, the error at the individual point is the sum of the localization error of the movement arm and the measurement error of the sensor. The error of the arm is generally larger than that of the 3D sensor, for the reasons mentioned. Overall, the accuracy of the system is relatively poor.

Furthermore, the sensor-based movement arm having typically seven axes and composed of carbon fiber is complicated and expensive.

BRIEF SUMMARY OF THE INVENTION

Therefore, it is an object of the invention to eliminate the abovementioned disadvantages from the prior art.

This object is achieved according to the invention by means of a device for detecting the geometrical shape of measurement objects with a computer, a 3D sensor and an object carrier for fixing the measurement object, wherein the computer is set up for combining, with the aid of suitable software, the measurements recorded by the 3D sensor, wherein the 3D sensor is an areally operating 3D sensor and the object carrier is adjustable in a manually guided manner about a plurality of linear axes and/or rotation axes by means of an adjusting device, wherein the adjusting device has position transmitters that forward their positions to the computer in the event of a measurement, and wherein the computer is set up for calculating, with the aid of suitable software, the position of the measurement object from the positions of the position transmitters and the positions of the axes relative to the 3D sensor.

In contrast to the line sensors that have been used hitherto in manually guided systems, the use of an areally operating 3D sensor (area sensor) permits a fine registration of the data.

3D data which arise as a result of fine registration can be very accurate since it is possible with very high accuracy to accurately calibrate the measurement volume of an area sensor, e.g. with the aid of photogrammetric methods. If the fields are calibrated accurately, then the result of the registration has only a very small error. The noise of the individual measurement points has almost no effect because averaging can always be performed over typically tens of thousands of individual points, since an area sensor based on video technology typically generates 1 million measurement points in a depth image.

By virtue of the fact that the measurement object rather than the 3D sensor is fastened to the manually guided system, it is considerably simpler for the 3D sensor unit to be constructed stiffly, unlike in the case of a complete movement arm in accordance with the prior art. The system accuracy of the system with fine registration is therefore essentially given by the calibration accuracy of the measurement volume and the stiffness of the 3D sensor.

The area sensor can be a stripe projection sensor, for example, which comprises a projector system and one or two camera systems.

The manually guided axial system has a coarse registration of the data, which can be attributed to knowledge of the object movement. Knowledge of the measurement object movement is made possible by the position transmitters on the adjusting device and also the known positions of the axes. Ideally, a fine registration additionally takes place afterward with the aid of suitable software and of the computer, wherein no interaction is necessary.

Since area sensors such as stripe projection sensors do not operate according to the single shot principle, they were deemed previously to be incompatible with the manually guided system. For this reason, the device advantageously has locking possibilities from the manually guided adjusting device. The locking can take place manually, e.g. with the aid of securing bolts, or in a drivable manner, e.g. with the aid of an electromagnet that can be switched on or with the aid of pneumatic systems. It likewise suffices to use sluggish axes that remain in the set position on account of their intrinsic restraint. Such axes are also regarded as lockable within the meaning of the invention.

The measurement of a sequence of depth images takes place by the manually guided axial system, that is to say the adjusting device, being brought manually in each case into a new measurement position, then the axial system in each case being locked, and then the measurement being initiated.

The user can perform the locking by means of a foot-operated switch. If the locking is effected in drivable fashion, then the measurement system can operate in a suitable measurement cycle and independently perform the locking and initiation of the measurement periodically. An electromagnet and periodic performance are suitable for performing a faster object measurement.

A manual positioning of the axial system is advantageous because the user directly sees the influence of viewing angle, light, shadows and disturbing reflections and can correct this influence directly with his own eyes and hands. A direct display on the screen is advantageous, such that the user can directly recognize which measurement object regions are still missing. This procedure is generally faster and thus more economical than programming motor-based movement programs and checking the success of these programs after measurement.

In addition or as an alternative to a locking, a motion compensation of the 3D sensor can also be carried out. In this way, a locking can be dispensed with, if appropriate, by virtue of the fact that a concept corresponding to the single shot principle is also used with the use of an area sensor. In order to achieve this, the following procedure is adopted: A specific image of the measurement sequence (generally the first image) is deemed to be the image recorded in a rest position. The other images have to be corrected laterally and in the stripe phases because small movements may have taken place in the meantime. This correction is referred to as motion compensation. One possible method corresponds to the prior art and has been published (T. Weise, B. Leibe, L. Van Gool, "Fast 3D Scanning with Automatic Motion Compensation", IEEE Conference on Computer Vision and Pattern Recognition (CVPR '07) Minneapolis, USA, July 2007).

The advantage when the locking is omitted is the periodically faster measurement that becomes possible since one or a plurality of handles are obviated and the object can be permanently guided manually.

The expression axes should be understood to mean linear axes or rotation axes. A linear axis comprises at least two parts that can be moved linearly relative to one another. For this purpose, it often has mechanical bearings and a mechanical guide. It can be characterized by a spatial vector representing the different directions. A rotation axis in any event comprises at least two parts that can be rotated relative to one another. It usually has bearings and a mechanical guide. It can be characterized by a spatial vector representing the direction of its axis of rotation.

The expression position transmitter is understood to mean linear position transmitters in the case of linear axes and angle position transmitters in the case of rotation axes.

In the case of the relatively long movement arms which are known from the prior art and to which a sensor is fitted, a practically handleable locking would be possible only with difficulty because the arm continues to oscillate for a long time. The locking of securing bolts at different locations would be very laborious and time-consuming.

The prior art also discloses axial systems which are moved in a motor-based manner and which operate with area sensors and fine registration, but such systems are extremely complicated. The system operated in a motor-based manner follows a programmed sequence according to which a specific sequence of 3D measurements from different viewing directions is effected. What is disadvantageous here is that a suitable sequence is initially not known and has to be determined by trial measurements. In this case, after carrying out the measurement, the user analyses where light and shadows fell and under which positions of the axial system moved in a motor-based manner as far as possible all the object details can be detected. This method is time-consuming whenever it is necessary to detect a new type of measurement object for which the sequence has not yet been determined. Here the manual guidance of the axial system in the manner according to the invention is significantly simpler, in the case of which manual guidance the user repeatedly manually positions the measurement object and in the process monitors the influence of shadows and the like, adapts the position and subsequently carries out a 3D measurement in each position in a computer-controlled manner.

The measure according to the invention of fastening the measurement object rather than the 3D sensor to the manually guided system has a number of reasons. Firstly, it is simpler and more economical, for objects which are smaller than the 3D sensor, to move the objects instead of the sensor on a manually guided axial system. Secondly, there is no actual symmetry between 3D sensor and measurement object. If the sensor is moved around a small measurement object, the tracked volume must have at least the shape of a hemisphere whose radius is the working distance of the 3D sensor. By contrast, if the small object is moved with the sensor stationary, the tracked volume can be small, independently of the working distance of the 3D sensor. In this way it is possible to produce manually guided axial systems with a small tracked volume which hold the measurement object rather than the 3D sensor. A tracked volume is designated as small if its spatial content is smaller than the spatial content of a hemisphere whose radius is the working distance of the 3D sensor.

Such a small axial system for a small tracked volume can be of such stiff construction that, for the use of an area sensor, which is not a single shot sensor, it does not continue to oscillate for a long time, but rather, preferably in a waiting time of less than 0.5 second, comes to rest to such an extent that an undisturbed measurement becomes possible. Furthermore, it can be constructed more cost-effectively.

In the case of an axial system which holds the object, the number of successive axes can be reduced to a maximum of six. In this way, costs are reduced and the follow-on oscillation behavior is improved. A reduction to six degrees of freedom is unproblematic since any spatial rotation and displacement can be described by six degrees of freedom.

For objects which are smaller than the measurement volume, it is furthermore possible to dispense with the displacement degrees of freedom. In this case, the system preferably has three rotation axes. If these three axes intersect at a point and the object carrier, which holds the measurement object, together with the axial system is constructed such that the point of intersection of the axes lies in the center of the measurement volume, the measurement object does not move out of the center of the measurement volume during the movement of the axes, whereby the tracked volume can advantageously be kept small.

A further reduction of the number of axes is possible in accordance with a further embodiment of the invention: One rotation degree of freedom can be omitted since the rotation of the area sensor about the 3D sensor/measurement object connecting axis affords only minor advantages. In accordance with this embodiment, the system is used with two rotation axes, wherein the two axes preferably intersect at a point lying in the center of measurement volume.

In order once again to elucidate the advantages of this geometry with two axes, spherical coordinates are introduced, the origin of which is situated at the point of intersection of the two axes. The two axes already ensure that the measurement system can look at the measurement object arbitrarily in the two degrees of freedom known from celestial mechanics (zenith distance and azimuth). Consequently, the most important angular degrees of freedom can already be set by means of this manually guided axial system.

However, other manually guided axial systems can also be realized. In principle, the manually guided axial systems can be composed of linear axes or rotation axes, and as mentioned are preferably intended to comprise a maximum of six axes and preferably have a small tracked volume.

The device advantageously also has a monitor, on which the recorded measurements can be displayed. If the measurement result is displayed directly on the screen, the user can directly recognize which object regions are possibly still missing.

The triggering of the position transmitters must take place during the measurement or with a negligible time difference. The time difference is negligible when the distance covered by the measurement object on the axial system at a speed of the manual movement in the time duration of the time difference is smaller than the measurement error of the 3D sensor. In the case of the area sensor with motion compensation (without locking), the read-out of the position transmitters must take place during the recording of the respective camera image which is deemed to be the one recorded in a rest position.

Expediently, the type and number of the linear and the rotation axes of the adjusting device and also their mutual spatial arrangement can be varied. For this purpose, the manually guided axial system can be modularly configured, configurable and disassemblable. This has the advantage that the manually guided axial system can be assembled individually appropriately with respect to the measurement object, for example if the measurement object is too large for the tracked volume or cannot be arbitrarily rotated or tilted. Examples of this include the recording of a human knee, a plate with a meal served thereon, a leather boot which does not retain its shape in every position, etc.

The user can configure that manually guided axial system with which the detection is possible and can be carried out with the least amount of work.

Expediently, the 3D sensor also has an adjustment possibility. The latter can be brought about for example by means of a dovetail guide combined with a ball head mount.

In order that a configurable manually guided axial system can be used in a practical manner at all, it is necessary to implement a method for calibrating the manually guided axial system. The aim of this method is to characterize the spatial position of the axes in the coordinate system of the 3D sensor. Such a method corresponds to the prior art. By way of example, the following method can be used:
1. Clamping on an arbitrary measurement object
2. Locking all degrees of freedom
3. Reference measurement
4. Releasing one axis whilst maintaining the locking of the remaining axes, adjusting this axis manually
5. Comparative measurement
6. Calculating the transformation between reference measurement and comparative measurement
7. Notifying the software of whether a linear or rotation axis is involved
8. Calculating the precise position of the axis from said transformation
9. Repeating steps 2-8 for the remaining axes.

The manually guided axial system can, if appropriate, also be reconfigured during a digitization process for a measurement object. The reconfiguration can also include the fact that the manually guided axial system can be completely removed.

For the case where the measurement volume is too small even after complete removal of the manually guided axial system, that is to say of the adjusting device, the 3D sensor can be fastened releasably from the device. By way of example, the 3D sensor can be removed from the arm of a measurement table and be fastened to a stand. The sensor is subsequently moved around the object. Although this is associated with a loss of the advantages according to the invention, that is to say that the 3D measurement is possible only with a higher degree of interaction using complicated registration methods, an apparatus configured in this way makes it possible for the user also to detect larger objects alongside the routine detection of small objects, though this is necessary significantly less frequently according to experience.

The 3D sensor should preferably be able to be fastened to the apparatus again in a mechanically reproducible manner in order that the preset axial calibration retains its validity and there is no need to carry out renewed calibration. A separable mount between the adjusting device and the sensor itself can serve for this purpose.

After each new process of clamping-on, it is normally necessary to carry out a complicated registration method, wherein the transformation parameters are determined in six degrees of freedom, namely in three degrees of freedom of rotation and three degrees of freedom of displacement. This can be done interactively or by means of automatic search algorithms, though problems occur with regard to the reliability of the method, such that it is often necessary for the user to correct the result found.

These difficulties can be avoided according to the invention by the restriction of the six degrees of freedom to be searched for in the unknown transformation which is to be newly found and which entails a new clamping-on process. One example is the movement of the measurement object onto the object carrier which takes place only with three degrees of freedom (lateral x, y displacement and rotation). In this way, the corresponding software with the automatic search algorithms only has to search three dimensions, which significantly increases the hit reliability.

According to the invention, the user notifies the software if he has carried out a new clamping-on with secondary conditions. Afterward, the software, with automatic search algorithms, searches for a correspondingly low-dimensional space or carries out an assessment of the results found during a six-dimensional search. Examples of a clamping-on with secondary conditions are the displacement and rotation of the measurement object freely on the object carrier (measurement table), that is to say displacement in the x, y-direction and rotation (three degrees of freedom) or the displacement of the measurement object along a stop rule (one degree of freedom).

In accordance with a further embodiment of the invention the intention is for it to be possible to carry out, rather than a new clamping-on of the measurement object with secondary conditions, the repositioning of the adjusting device including the measurement object situated thereon on a base surface. Examples of this include:
a) Displacement and rotation of the manually guided axial system freely on the base surface, that is to say displacement in the x and y-direction and rotation,
b) displacement of the manually guided axial system along one or more stop rules, or
c) displacement in the x-y direction in defined positions of a plug board with a rectangular grid of n×m fixings, for example by means of fitting pins.

The positioning of the axial system that is originally known to the system and arose as a result of calibration of the axial system is preferably intended to be mechanically reproducible. An end stop on a rule, an angle stop or a specific agreed position in the x-y grid can be used for this purpose.

In the case of a repositioning away from the original positioning, the user is notified of this and the type of repositioning. The software then performs the following steps:
1. Reference measurement in the original position of the axial system,
2. repositioning of the axial system by the user,
3. comparative measurement of the object and establishment of the transformation between reference measurement and comparative measurement,
4. application of the measurement object transformation found inversely to all of the axes and determination of the position of the repositioned axial system.

Furthermore, the transformation has to be applied inversely to all the depth images detected previously, since the object together with the axial system has also been displaced.

The repositioning of the axial system can be effected during an object measurement. The data newly measured later will match the data obtained after the repositioning in the case of correction transformation.

In accordance with a further embodiment of the invention, the adjusting device is also adjustable by at least some linear and/or rotation axes with the aid of a motor, in which case, however, the possibility of manual adjustment must also be maintained. This applies to the rotation axes, in particular. In this case, the manual adjustment is effected counter to the holding force of the quiescent motor.

The motors can be e.g. commercially available stepper motors of medium size (approximately 4 cm) which rotate the axis without a gear mechanism. If the motor is not currently performing any steps, generally it is nevertheless energized and opposes the torque exerted manually with a mechanical resistance. The resistance can be overcome, however, in the case of a motor of the size described.

Since the position transmitters continue to function, the system behaves no differently than the embodiments described above. In addition, however, after a request by the user, e.g. upon a button being pressed, with the motor the system can conduct a specific standardized partial measurement strategy. In each position of the measurement strategy, the position transmitters supply the required actuating information to the software. If such measurement sequences are supported by motor, time can be saved in this part of the measurement.

Furthermore, it is possible to use a plurality of 3D sensors which are either fitted to the device simultaneously or else kept ready in an interchangeable manner. Different 3D sensors can have different resolutions and measurement values. The user can accordingly select the best-suited 3D sensor depending on the measurement object. The parameters of the calibration of the respective sensors need to have been determined and to be managed by the software.

If the sensors are mounted simultaneously on the apparatus, only one of the sensors in each case is active.

As an alternative, it is also possible to use a 3D sensor whose optical system can be configured in a plurality of positions in a manner such that the sensor functions as a sensor in each position, but has a different measurement volume in each case. This can be realized e.g. with controllable motorized zoom lenses on the cameras and the projector of the 3D sensor. For each position of the optical system, the parameters of the sensor calibration need to have been determined for the 3D sensor, which parameters can then be applied. All the sensor calibrations should preferably relate to the same coordinate system with the aid of a coordinate transformation of the calibration.

In accordance with a further embodiment of the invention, the light source of the 3D sensor can be adapted in terms of its brightness directly, e.g. by means of a potentiometer, toward the brightness of the measurement object or of the measurement object detail situated in the measurement volume. The user receives direct feedback by means of a live video display of the signal of a camera and of the 3D sensor. Overdriven or underdriven object regions can be indicated in this video display, e.g. by means of a false color representation. Instead of the adjustment of the brightness of the light source, the adjustment of the integration time or gain of the cameras of the 3D sensor using suitable electronic aids, or suitable programming is also taken into consideration.

In addition to the device according to the invention, the invention also relates to a method for flexibly detecting the geometrical shape of measurement objects with the aid of the device according to the invention, comprising the following steps:

Fixing the measurement object on the object carrier
repeatedly manually positioning the measurement object and recording measurements whilst at the same time detecting the positions of the position transmitters, and calculating the positions of the measurement object from the positions of the position transmitters and the positions of the axes relative to the 3D sensor and combining the recorded measurements by means of the computer with the aid of suitable software.

The invention is explained in more detail with reference to the accompanying figures, in which:

DESCRIPTION OF THE INVENTION

Figure 1:
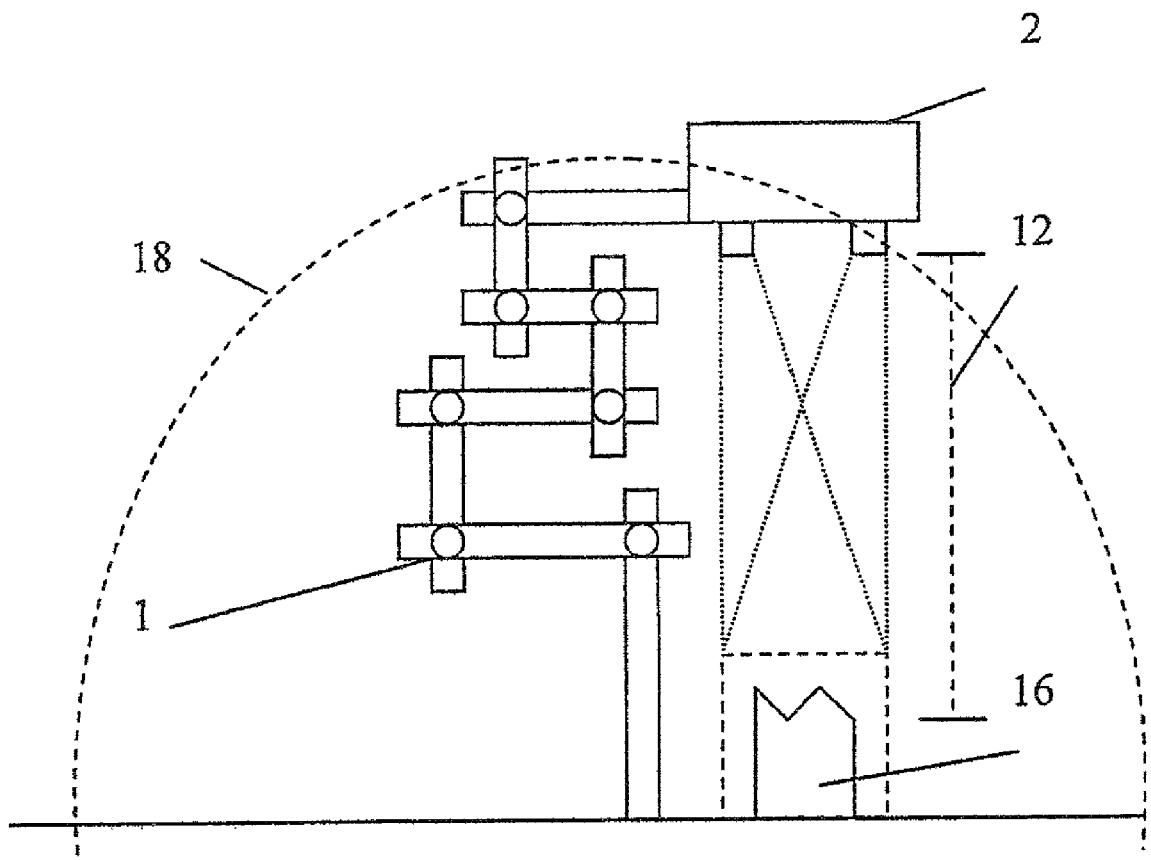
FIG. 1 shows a device for detecting the geometrical shape of measurement objects in accordance with the prior art.

FIG. 1 illustrates a device for detecting the geometrical shape of objects from the prior art, which comprises a sensor-based movement arm 1, to which a 3D sensor 2 operating in punctiform or linear fashion is fitted. The measurement object 16 is detected with the aid of the 3D sensor. The sensor-based measurement arm has seven rotation axes which are moved manually and are equipped with position transmitters. The working distance between 3D sensor 2 and measurement object 16 is identified by the reference symbol 12.

The movement arm 1 can sweep over a specific space, referred to as "tracked volume" 18. The movement arm 1 fastened on a base surface in this case sweeps over a tracked volume 18 having an approximately hemispherical shape.

Figure 2:
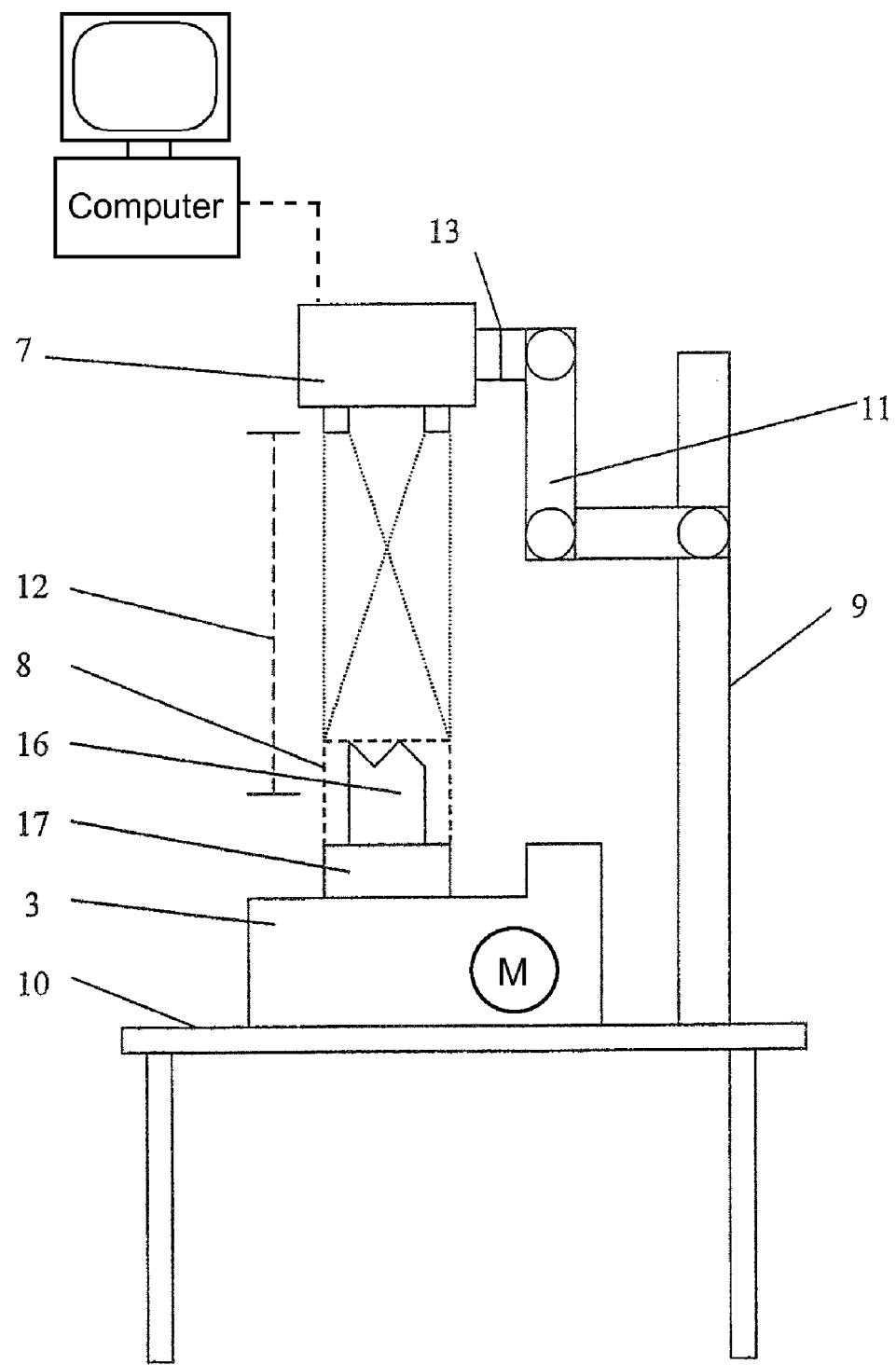
FIG. 2 shows a device according to the invention for detecting the geometrical shape of measurement objects.

FIG. 2 schematically illustrates an embodiment of the invention. An adjusting device 3 in the form of a manually guided axial system is situated on a measurement table, which forms a base surface 10, said adjusting device being provided with an object carrier 17, on which the measurement object 16 is situated. The areally operating 3D sensor 7 is held by a holding arm 9 and carries out the measurements in the measurement volume 8. The working distance between measurement object 16 and 3D sensor 7 is once again provided with the reference symbol 12. The 3D sensor 7 is adjustable in terms of its position with respect to the measurement table, for which reason the holding arm 9 has an adjustment possibility 11, for example a dovetail guide combined with a ball head mount. Furthermore, the mount 13 is embodied such that it is separable between the holding arm 9 and the 3D sensor 7, in which case the 3D sensor 7 can be fastened to the system again in a mechanically reproducible manner in order that the preset axial calibration retains its validity. A new axial calibration after the fitting of the 3D sensor 7 is therefore not necessary.

In the case where interchangeable 3D sensors 7 are provided it should be expected that the different 3D sensors 7 have a different working distance 12 with respect to the center of the measurement volume 8. However, since it is desirable not to have to adjust the adjustment possibility 11 for the 3D sensor 7 in the case of a sensor interchange, the sensor-side part of the separable mount 13 is preferably intended to be fitted to the 3D sensor 7 at a specific location, which differs from 3D sensor 7 to 3D sensor 7, however, such that the center of the measurement volume 8 is in each case situated at the same distance from the mount 13.

By means of a suitable coordinate transformation with respect to the same coordinate system in one of these calibrations, what is preferably intended to be achieved is that the latter detect the measurement volume in the same coordinate system. This has the effect that only one position of the manually guided axial system has to be managed by the computer, and that after the resetting or changeover of a 3D sensor 7, object data points and axial position immediately lie at the same location as in the earlier configuration, such that there is no need to carry out a new axial calibration. In the case of using a 3D sensor 7 whose optical system can be configured in a plurality of positions, such that although the 3D sensor 7 functions as a sensor in each position, it has a different measurement volume 8 in each case, it should likewise be expected that the working distance 12 of the 3D sensor 7 also changes for each position of the optical system. Therefore, an associated location of the fastening of the sensor-side part of the separable mount 13 should preferably be provided for each position of the optical system, for example by fitting threads, such that the center of the measurement volume 8 is in each case situated at the same distance from said mount 13 when the associated fastening location is chosen.

Figure 3:
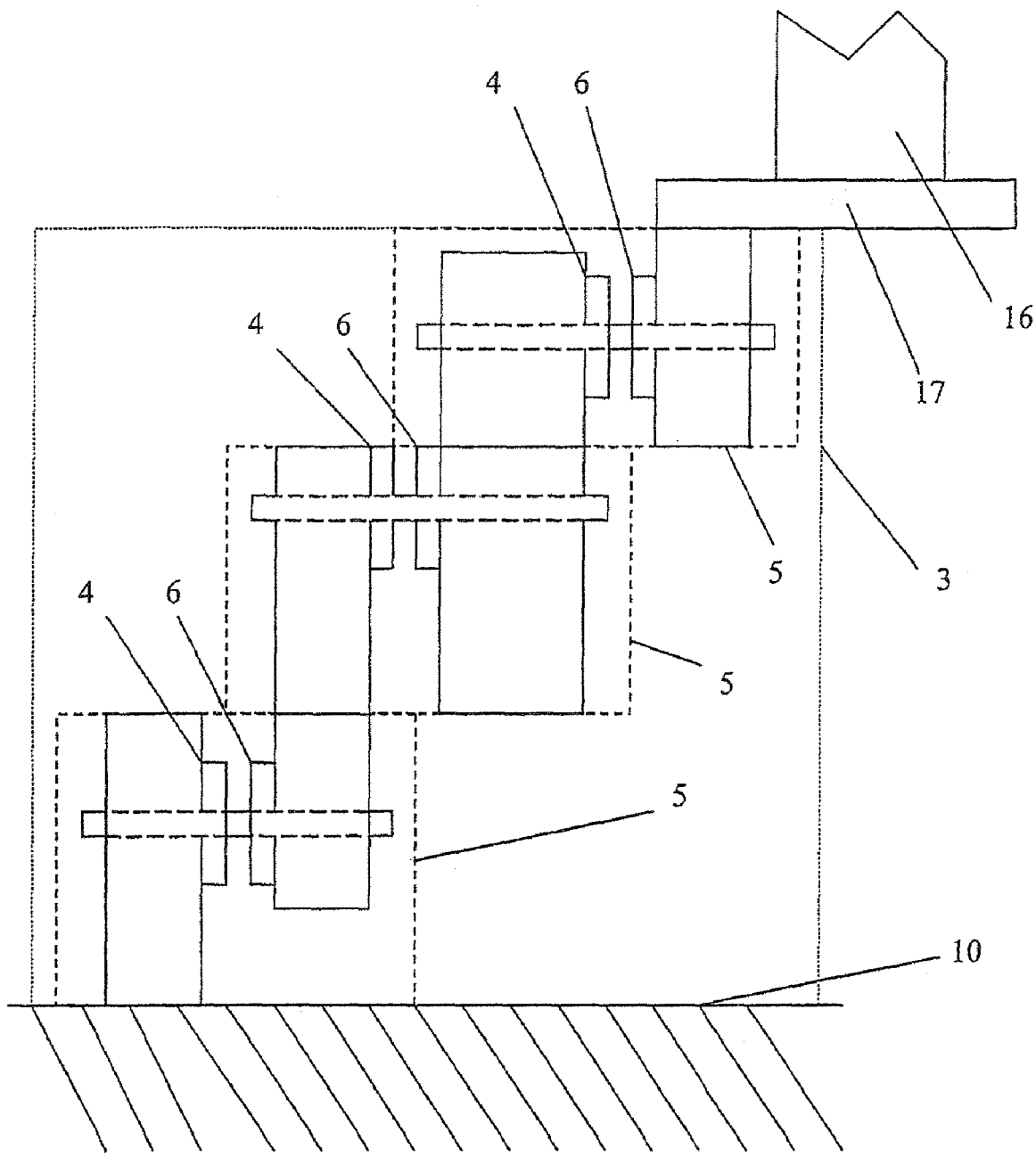
FIG. 3 shows a device according to the invention with a total of four rotation axes.

FIG. 3 schematically illustrates an adjusting device 3 with four rotation axes 5. The axial system of the adjusting device 3 holds a measurement object 16 with an object carrier 17. All of the axes 5 are provided with locking possibilities 6 and position transmitters 4.

Figure 4:
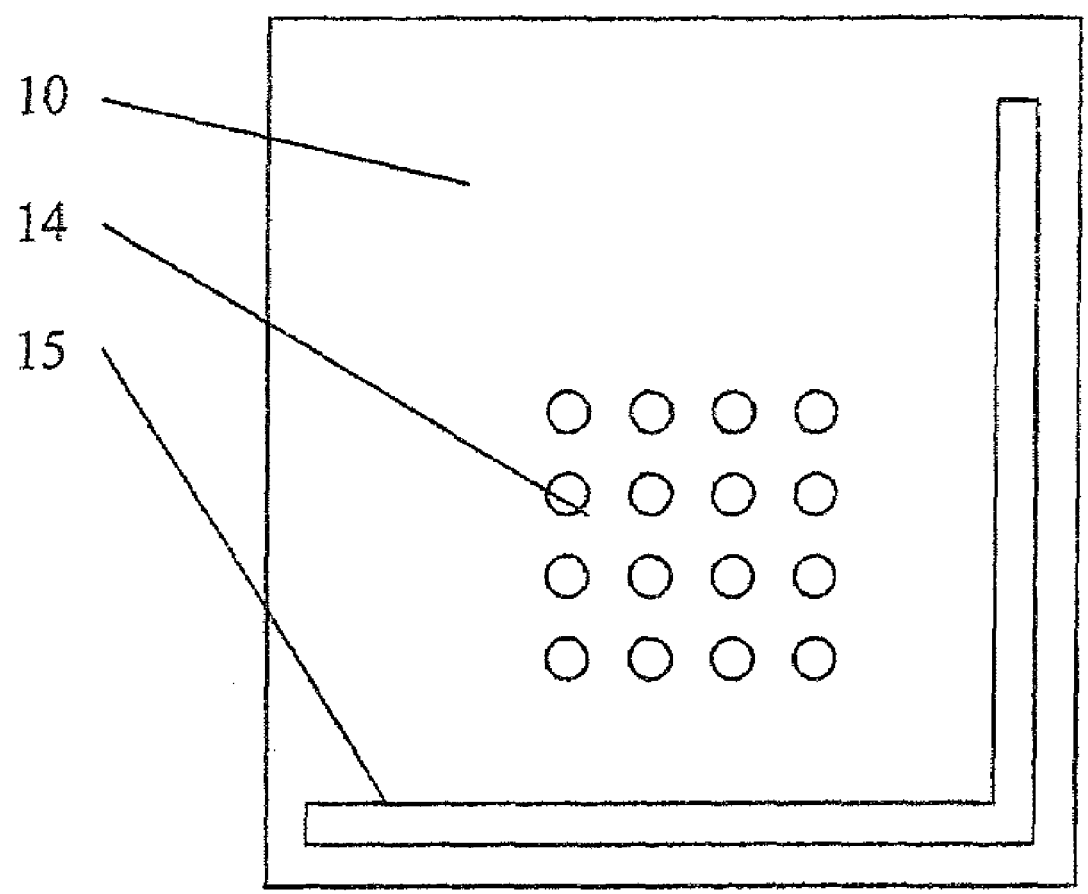
FIG. 4 shows possibilities for repositioning the adjusting device on a base surface.

FIG. 4 illustrates in plan view a base surface that permits a repositioning of the entire adjusting device 3 including the measurement object 16 situated thereon. The base surface 10 is usually the surface of the measurement table. The adjusting device 3 can be implemented along an angle stop 15, in which case one limb of the angle stop 15 serves as a stop rule, and the other limb serves as an end stop. Even in the case of a free displacement and rotation of the adjusting device 3, the angle stop 15 can serve as an end stop.

Furthermore, the base surface 10 has a plug board 14 having defined positions within a grid having 4×4 fixing possibilities. The fixing can be brought about by means of corresponding fitting pins, for example.

The invention claimed is:

1. A device for determining a geometrical shape of a measurement object, comprising:
    an areally operating 3D sensor;
    an object carrier for fixing the measurement object within a viewing field of said 3D sensor, said object carrier being mounted for manually guided adjustment about a plurality of axes selected from the group of linear axes and rotation axes by way of an adjusting device;
    said adjusting device including position sensors for outputting signals relating to a position thereof;
    a computer connected to said 3D sensor and to said position sensors of said adjusting device, said computer being programmed with software to:
        calculate the relative position of the measurement object from the position signals of the position sensors and from positions of the plurality of axes relative to said 3D sensor; and
        combine measurements received from said 3D sensor, for determining the geometrical shape of the measurement object.

2. The device according to claim 1, wherein said adjusting device includes locking devices.

3. The device according to claim 1, which comprises means for a motion compensation of said 3D sensor.

4. The device according to claim 1, wherein said 3D sensor is a stripe projection sensor.

5. The device according to claim 1, wherein said computer is programmed to carry out image registration.

6. The device according to claim 5, wherein said computer is programmed to carry out fine registration.

7. The device according to claim 1, wherein a total number of linear axes and rotation axes is equal to or less than 6.

8. The device according to claim 7, wherein said adjusting device is adjustable about a total of two rotation axes.

9. The device according to claim 7, wherein said adjusting device is adjustable about a total of three rotation axes.

10. The device according to claim 1, which further comprises a display monitor connected for display of the recorded measurements.

11. The device according to claim 1, wherein a type and a number of said linear axes and rotation axes of said adjusting device and also a mutual spatial arrangement ngement thereof is variable.

12. The device according to claim 1, wherein said 3D sensor is adjustably mounted.

13. The device according to claim 1, wherein said 3D sensor is releasably mounted.

14. The device according to claim 1, wherein said adjusting device is positionabie on a base surface.

15. The device according to claim 1, which comprises a motor disposed to additionally adjust said adjusting device about at least some linear and/or rotation axes.

16. The device according to claim 1, wherein said 3D sensor is one of a plurality of interchangeably mountable 3D sensors.

17. The device according to claim 1, wherein said 3D sensor is one of a plurality of simultaneously mounted 3D sensors.

18. A method of determining a geometrical shape of a measurement object, the method which comprises:
   providing a device according to claim 1;
   fixing the measurement object on the object carrier;
   multiply manually positioning the measurement object and recording measurements, and simultaneously detecting the positions of the position sensors; and
   calculating the positions of the measurement object from the positions of the position transmitters and the positions of the axes relative to the 3D sensor and combining the measurements by way of the computer having suitable software loaded therein.

19. The method according to claim 18, which comprises when performing the step of multiply manually positioning the measurement object, adapting each position of the measurement object based on an influence of shadows at each position.

\* \* \* \* \*